United States Patent [19]

De Leeuw et al.

[11] Patent Number: 4,612,823

[45] Date of Patent: Sep. 23, 1986

[54] VEHICLE PARKING BRAKE MECHANISM

[75] Inventors: William L. De Leeuw, Sterling Hgts.; Kenneth R. Creighton, Canton, both of Mich.

[73] Assignee: Wickes Manufacturing Company, Southfield, Mich.

[21] Appl. No.: 778,869

[22] Filed: Sep. 23, 1985

[51] Int. Cl.[4] ............................................. G05G 5/06
[52] U.S. Cl. ........................................ 74/533; 74/534; 74/535; 74/536; 74/539; 74/540; 74/542
[58] Field of Search ................. 74/512, 533, 534, 535, 74/536, 539, 540, 541, 542

[56] References Cited

U.S. PATENT DOCUMENTS

| 943,104 | 12/1909 | Strohkorb | 74/512 |
| 3,136,177 | 6/1964 | Roberts et al. | 74/531 |
| 3,184,992 | 5/1965 | Hinsey et al. | 74/535 |
| 3,511,107 | 5/1970 | Yasiro | 74/512 |
| 3,875,820 | 4/1975 | Morden | 74/512 |
| 3,929,033 | 12/1975 | Marx | 74/512 |
| 3,974,713 | 8/1976 | Toohey | 74/512 |
| 4,570,508 | 2/1986 | Nicholson et al. | 74/535 |

FOREIGN PATENT DOCUMENTS 54-13134  1/1979  Japan .................................. 74/534

Primary Examiner—Albert J. Makay
Assistant Examiner—David W. Westphal
Attorney, Agent, or Firm—Body, Vickers & Daniels

[57] ABSTRACT

A foot operated vehicle parking brake mechanism comprises a brake pedal lever and a brake cable actuator pivotal about a common axis, the brake pedal lever being operable upon depression to displace the cable actuator to a cable tensioning position in which the vehicle brake is set. The cable actuator and pedal lever are independently releaseably retained in the cable tensioning and depressed positions and, respectively, against the bias of the tensioned cable and a pedal lever biasing spring. A manually operable release mechanism operates to release the pedal lever from its depressed position and, during return of the pedal lever to its retracted position, the pedal lever operates to release the cable actuator for return to its released position.

23 Claims, 10 Drawing Figures

VEHICLE PARKING BRAKE MECHANISM

BACKGROUND OF THE INVENTION

This invention relates to vehicle parking brake mechanisms and, more particularly, to parking brake mechanisms of the character wherein a foot pedal lever is depressed to tension a brake cable by which the parking brake is set.

It is of course well known to provide a vehicle with a parking brake mechanism of the character including a foot operated pedal lever which is displaced from a retracted to a depressed position to achieve tensioning of the brake cable and setting of the parking brake. In certain of such mechanisms heretofore provided, the brake cable is directly attached to the pedal lever and the pedal lever is releaseably retained in the depressed position in which the parking brake is set and, thus, against the tension in the brake cable. Upon release of the parking brake mechanism, the foot pedal lever is returned to its retracted position with tremendous force as a result of the cable tension. Such brake mechanisms include a pedal lever bumper or stop to arrest the pedal lever in the retracted position, and the return force of the pedal lever results in rapid deterioration of the bumper and a loud noise upon impact between the pedal lever and bumper. Moreover, an undesirably heavy construction of the component parts is required to prevent a change in the retracted position of the pedal lever due to pedal lever or bumper deflection resulting from repeated high force impacting therebetween. Other attempts to dampen the high force return of brake pedal levers which are set under cable tension, such as through the use of dampening springs and air springs, are unacceptable from the standpoint of high cost and, moreover, such devices create problems with respect to assuring repeated return of the pedal lever completely to its retracted position while keeping the necessary pedal actuating force below the government standard of one-hundred and twenty-five pounds.

Efforts to avoid the foregoing disadvantages of cable returned pedal levers have included multi-stroke type brake mechanisms. In mechanisms of the latter character, the pedal lever is stroked one or more times to the depressed position to rotate a cable actuator which tensions the brake cable and holds the latter in its tensioned position, and the brake lever returns to its retracted position after each stroke and thus is in its retracted position when the parking brake is actuated. Brake mechanisms of this character, however, are objectionable to vehicle operators in that there is no visual indication as to whether or not the parking brake is set. This can result in mental anguish and/or undesirable wear or damage to the brake mechanism when, for example, the operator attempts to drive the vehicle when the parking brake is set. Such anguish and possible physical injury can occur when, as another example, the operator wants the brake set and, thinking that it isn't, pushes the brake pedal expecting resistance and there is none. In the latter situation, the operator could check as to whether the brake is set or not by pulling on the mechanical release mechanism, but doing so would of course release the parking brake requiring the operator to reset it, whereby the frustration is not avoided.

SUMMARY OF THE INVENTION

The foregoing problems and disadvantages attendant to the construction and use of foot operated vehicle parking brakes heretofore provided are advantageously overcome in accordance with the present invention wherein a pedal lever and a cable tensioning member are each retained in the depressed or parking brake set position thereof against a corresponding return bias and are sequentially released for independent return to their initial positions. More particularly, the pedal lever is returned to its retracted position by a corresponding biasing spring and is operable during return movement to, release the cable tensioning member for return to the released position thereof by the tension in the brake cable. Minimum spring force is required to return the pedal lever to its retracted position, whereby it will be appreciated that the problems of noise and stop member deterioration resulting from such return by the tensioned brake cable are avoided as is the necessity for a heavy construction to resist deterioration and distortion. At the same time, the desirable feature of holding the brake pedal in its depressed, brake set position to visually indicate the same to the vehicle operator is retained.

In accordance with a preferred embodiment of the invention, the foregoing operational characteristics are achieved by providing foot pedal lever and brake cable drum components which are supported for pivotal movement in opposite directions about a common axis, both together and relative to one another. The brake pedal lever is displaceable between retracted and depressed positions respectively corresponding to released and cable tensioning positions of the cable drum. The foot pedal lever is biased toward the retracted position by a pedal return spring, and the cable drum is biased to the released position thereof by tension in the brake cable. A one-way clutch arrangement is provided between the brake pedal lever and cable drum which provides for displacement of the pedal lever from the retracted to the depressed position to displace the cable drum from the released to the cable tensioning position in which the parking brake is set. The pedal lever and cable drum are releaseably held in the depressed and cable tensioning positions thereof, and the release mechanism for the parking brake includes a first portion which releases the foot pedal lever for return to the retracted position thereof by the pedal return spring and a second portion which is actuated by the pedal lever during its return movement to release the cable drum for return movement to its released position by tension in the brake cable. Preferably, the pedal lever return spring operatively interengages the pedal lever and cable drum in a manner which provides for the cable drum to be biased in the cable tensioning direction when the pedal lever is in the retracted position. This provides for self-adjustment of the parking brake mechanism to physical changes in the cable and/or brake assembly resulting from repeated use of the parking brake.

It is accordingly an outstanding object of the present invention to provide an improved vehicle parking brake operating mechanism of the type in which the parking brake is set by the tensioning of a brake cable in response to depression of a foot pedal lever.

Another object is the provision of a brake operating mechanism of the foregoing character wherein the foot pedal lever remains depressed when the parking brake is set and is returned to its retracted position upon release of the parking brake independent of the brake cable tension force.

A further object is the provision of a brake operating mechanism of the foregoing character wherein the brake pedal lever and a cable tensioning component are respectively retained in depressed and cable tensioning positions when the parking brake is set and, upon release of the parking brake, are sequentially returned to retracted and released positions under the influence of corresponding and independent biasing forces.

Yet another object is the provision of a parking brake operating mechanism of the foregoing character in which return movement of the brake pedal lever to its retracted position actuates release of the cable tensioning component for return to its released position.

Still another object is the provision of a parking brake operating mechanism of the foregoing character wherein a pedal return biasing spring operable to return the pedal lever from its depressed to its retracted position independent of the brake cable tension force is operatively interconected with the brake cable tensioning component to bias the latter in the cable tensioning direction when the parking brake is released and the pedal lever is in its retracted position.

Still a further object is the provision of a parking brake operating mechanism of the foregoing character which is operable to achieve lower impact loading of component parts and a lower noise level of operation upon release from the brake set position than heretofore possible, while advantageously providing visual indication of the brake set condition.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
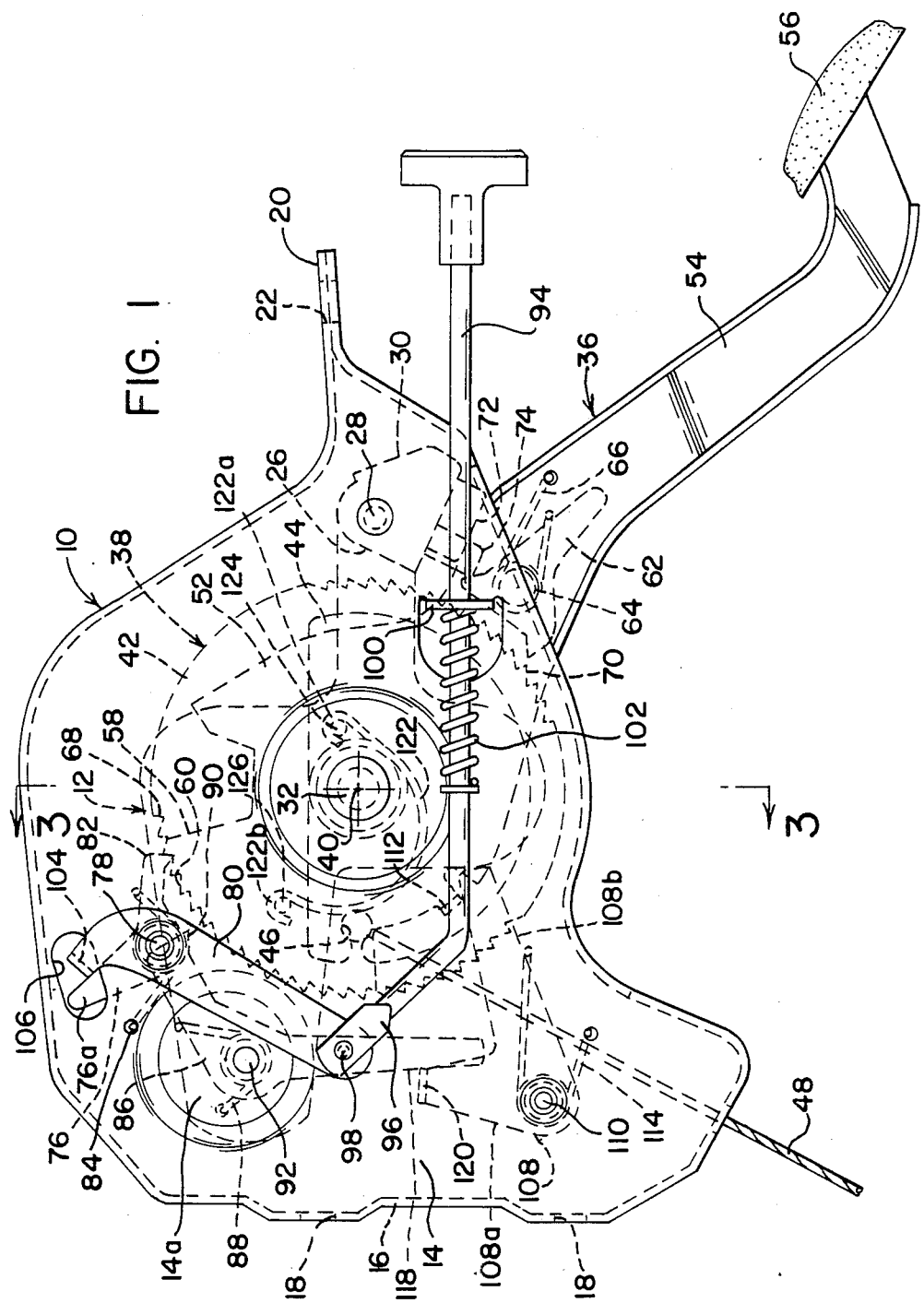
FIG. 1 is a side elevation view of a parking brake operating mechanism according to the present invention.

With reference now in greater detail to the drawings wherein the showings are for the purpose of illustrating a preferred embodiment of the invention only and not for the purpose of limiting the invention, a vehicle parking brake operating mechanism according to the present invention comprises a support and mounting assembly defined by a housing component 10 and a plate 12 which are laterally spaced apart and interconnected as set forth more fully hereinafter. Housing member 10 includes a vertical wall 14 and a peripheral flange extending laterally toward support plate 12 and including a front portion 16 provided with openings 18 and a rear portion 20 provided with an opening 22. Openings 18 and 22 facilitate mounting of the support assembly and thus the brake operating mechanism on appropriate structural components of a vehicle.

Figure 2:
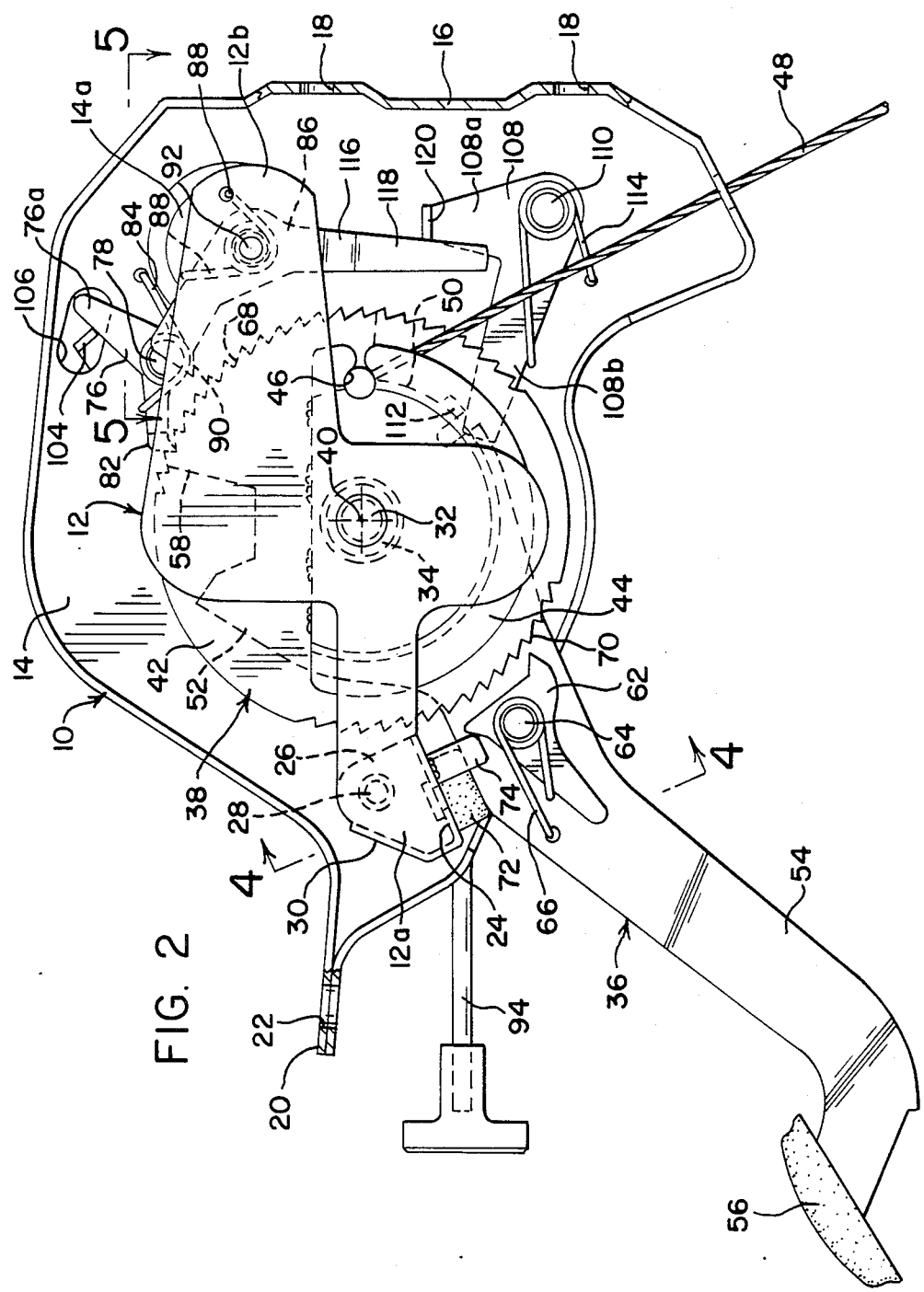
FIG. 2 is a side elevation view of the opposite side of the mechanism shown in FIG. 1.
Figure 3:
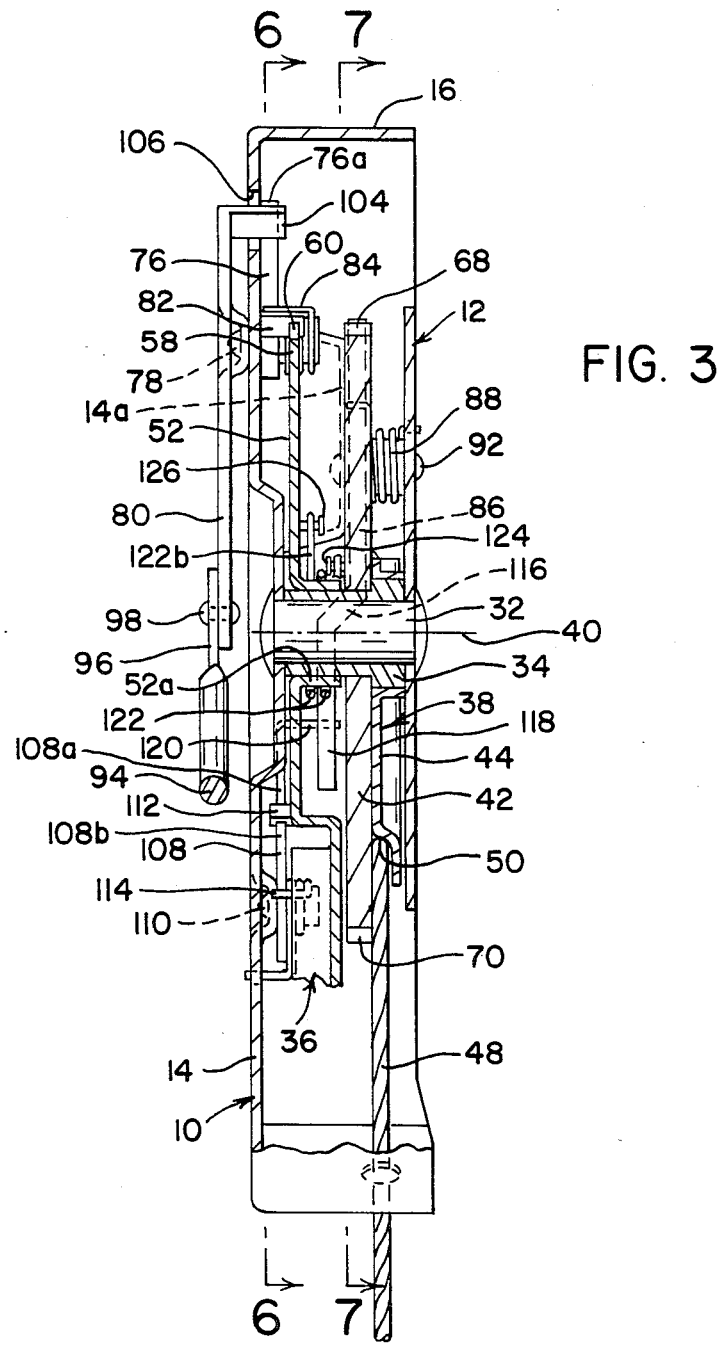
FIG. 3 is a cross-sectional elevation view taken along line 3—3 in FIG. 1.
Figure 4:
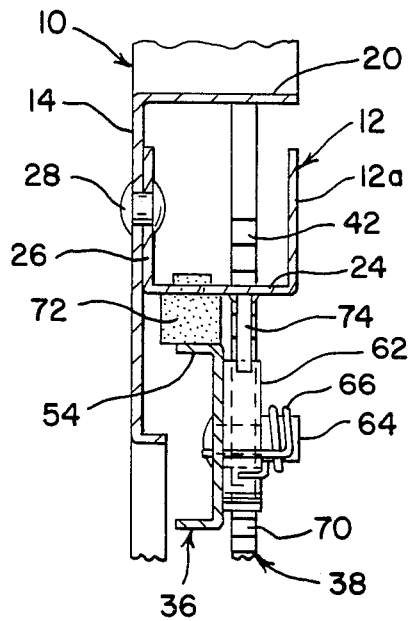
FIG. 4 is a detailed view in section taken along line 4—4 in FIG. 2.

As best seen in FIGS. 2 and 4 of the drawing, end 12a of support plate 12 is provided with a flange 24 extending laterally toward housing wall 14 and an upwardly extending flange 26 which is secured to wall 14 such as by a rivet 28 to laterally space and interconnect housing 10 and support plate 12 at this point. Rigidity is provided for end 12a of the support plate by means of a cross plate 30 which is welded or otherwise secured thereto. As best seen in FIGS. 1, 2 and 3 of the drawing, housing 10 and support plate 12 are further interconnected in laterally spaced apart relationship by means of a post 32 and a spacer and bearing sleeve 34 thereabout. Bearing sleeve 34 supports a pedal lever component 36 and a cable drum assembly 38 for pivotal displacement in opposite directions about axis 40 of pin 32 in the manner and for the purpose set forth hereinafter. Cable drum assembly 38 includes an annular plate member 42 and an arcuate cable drum plate 44 adjacent and fastened to one face of plate 42, and which plate 44 is provided at one end thereof with an enlarged opening 46 for attachment to an enlargement on the corresponding end of brake cable 48. The outer periphery of the arcuate portion of plate 44 is provided with a cable receiving channel 50 into which cable 48 is displaced during a brake setting operation as described hereinafter.

Figure 6:
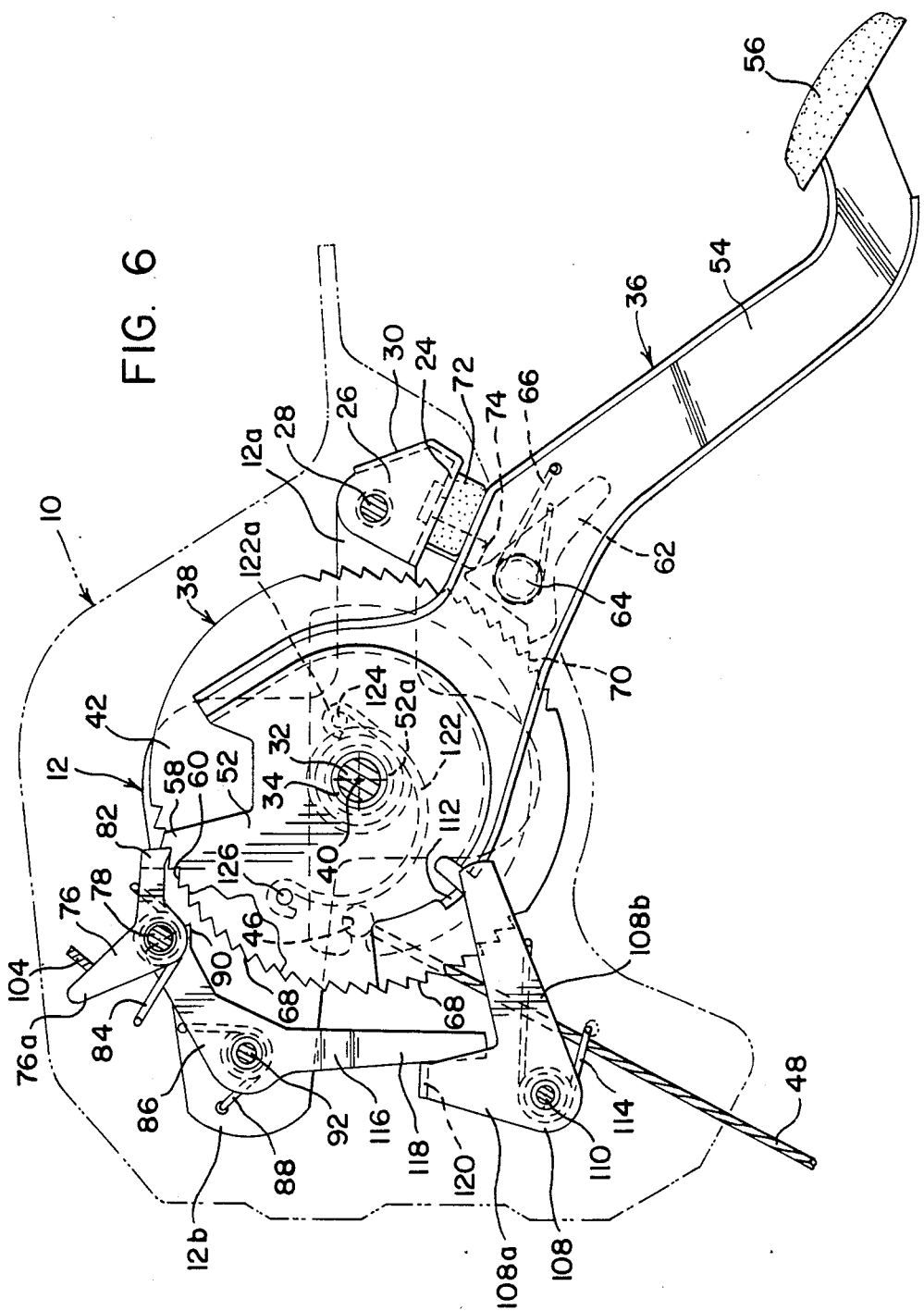
FIG. 6 is a sectional side elevation view looking in the direction of line 6—6 in FIG. 3.

As best seen in FIGS. 1, 2 and 6 of the drawing, brake pedal lever 36 is of heavy gauge sheet metal construction and includes a hub portion 52 by which the pedal lever is mounted on bearing sleeve 34 and a depending foot pedal lever arm 54 provided at its lower end with a suitable foot pad 56. Hub portion 52 includes a plate portion 58 having an arcuate edge provided with teeth 60 for the purpose set forth hereinafter, and lever arm 54 carries a one-way drive pawl 62 pivotally mounted thereon by means of a pin 64 and biased by means of a spring 66 to pivot clockwise with respect to the disposition thereof shown in FIGS. 1 and 6. As best seen in FIGS. 1-3 and 7 of the drawing, annular plate 42 of the cable drum assembly is laterally adjacent pedal lever 36 and is provided at least along a portion if its outer periphery corresponding to plate portion 58 of the pedal lever with teeth 68 and along the portion of the outer periphery thereof adjacent lever arm 54 with teeth 70. Teeth 70 are engaged by pawl 62 in connection with a brake setting operation as will become apparent hereinafter. When the component parts are in the brake release positions thereof shown in the drawing, lever arm 54 of the pedal lever engages against a stop pad 72 supported on flange 24 at end 12a of support plate 12, and pawl 62 is engaged by a positioning member 74 which depends from flange 24 and serves to displace pawl 62 counterclockwise to the position shown in FIG. 6 in which the nose of the pawl is out of engagement with teeth 70.

Figure 5:
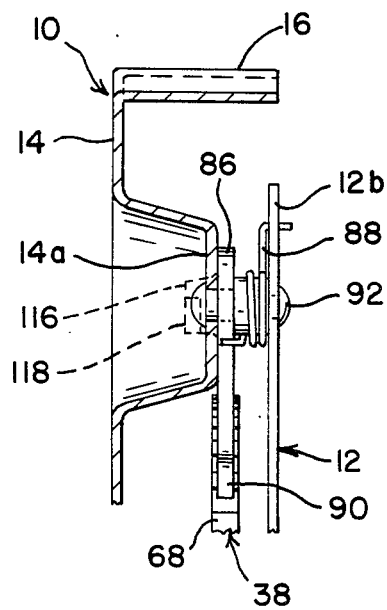
FIG. 5 is a detailed sectional view taken along line 5—5 in FIG. 2.
Figure 7:
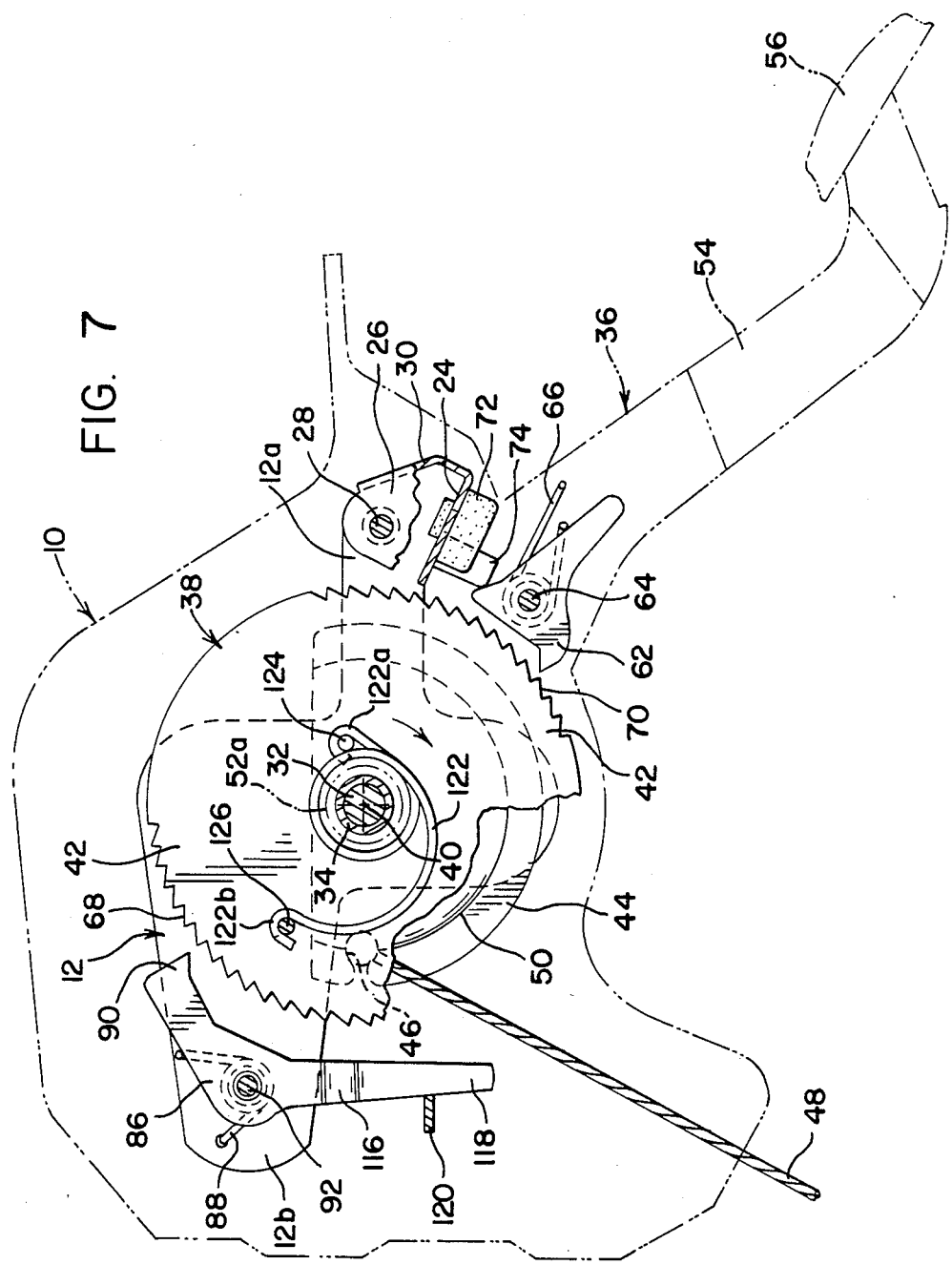
FIG. 7 is a sectional side elevation view looking in the direction of line 7—7 in FIG. 3.

As best seen in FIGS. 1 and 6 of the drawing, the brake operating mechanism further includes a pawl 76 pivotally mounted on the inner side of housing wall 14 by means of a pin 78 together with a release lever 80 adjacent the outer side of wall 14 and which serves the purpose set forth hereinafter. Pawl 76 has a nose portion 82 positioned to engage teeth 60 of pedal lever 36 when the latter is displaced counterclockwise from the position shown in FIG. 6, and the pawl serves to releaseably hold the pedal lever in its depressed position in which the parking brake is set. A biasing spring 84 operates to bias nose 82 toward teeth 60 for this purpose. As best seen in FIGS. 1, 6 and 7, a holding pawl 86 is operable to engage teeth 68 of the cable drum assembly during a brake setting operation and to hold the cable drum assembly in the cable tensioning position thereof in which the parking brake is set, such holding being independent of the holding of the pedal lever by pawl 76. A biasing spring 88 operates to bias nose 90 of holding pawl 86 toward teeth 68 and, for the reason set forth hereinafter, pawl 86 is positioned with nose 90 out of engagement with teeth 68 when the component parts are in the brake released positions shown in FIGS. 6 and 7. As best seen in FIGS. 2, 5 and 6, the mount for pawl 86 also provides a further point of lateral interconnection between housing wall 14 and end portion 12b of support plate 12. More particularly in this respect, housing wall 14 is provided with a depressed portion providing an inner wall 14a opposite end portion 12b of the support plate, and pawl 86 is pivotally captured therebetween by means of a pin 92 by which the housing wall and support plate are laterally staked together.

Release of the pedal lever and cable drum assembly for return to their initial positions following a brake setting operation is provided by a release mechanism which includes a first release portion defined by lever 80 referred to hereinabove. The first release portion further includes a manually actuable operating rod 94 having an inner end 96 pivotally connected to the lower end of release lever 80 by means of a pin 98, as best seen in FIGS. 1 and 3 of the drawing. Housing wall 14 is provided with an apertured tab 100 extending laterally outwardly therefrom and through which rod 94 extends for support, and a biasing spring 102 surrounds rod 94 behind tab 100 and has one end engaging the tab and its opposite end secured to rod 94, thus to bias rod 94 from right to left in FIG. 1. The upper end of release lever 80 has a tab 104 extending laterally inwardly of housing wall 14 through an opening 106 therein, and tab 104 is positioned forwardly of upper end 76a of pawl 76. The release arrangement includes a second portion defined by a release lever 108 pivotally mounted on the inner side of housing wall 14 by means of a pin 110, and a release actuating tab 112 on hub portion 52 of pedal lever 36. A biasing spring 114 biases release lever 108 counter-clockwise as seen in FIG. 6 of the drawings. Pawl 86 has a leg depending from pivot pin 92 and including a laterally inclined upper portion 116 and a vertical lower portion 118 which is disposed forwardly of a tab 120 on leg 108a of release lever 108. Release lever 108 further includes a leg 108b extending radially inwardly toward pivot pin 32 and into the path of tab 112 on the hub of pedal lever 36. For the reason which will be set forth hereinafter, when the component parts are in the brake released position shown in FIG. 6, tab 112 engages leg 108b of lever 108 to pivot the latter clockwise about pin 110, whereby tab 120 on leg 108a engages leg 118 of pawl 86 to displace and hold nose 90 out of engagement with teeth 68 of the cable drum assembly.

As will be appreciated from FIGS. 3, 6 and 7 of the drawing, a pedal lever return and cable drum adjusting spring 122 is coiled around hub flange 52a of pedal lever 36 and is laterally between hub portion 52 and cable drum plate member 42. One end 122a of spring 122 is connected to plate 42 by means of a pin 124, and the other end 122b of the spring is connected to pedal lever hub 52 by means of a pin 126. Spring 122 is coiled in compression when the component parts are in the positions shown in FIG. 6, whereby, with pedal lever arm 54 in engagement with stop pad 72, spring 122 biases cable drum plate 42 clockwise from the position shown in FIGS. 6 and 7. It will be appreciated that this bias is in the direction to tension cable 48, thus to compensate for any slack therein.

It is believed that the following description of the operation of the mechanism with reference to FIGS. 1, 6 and 7 will be understood from the foregoing description of the component parts of the mechanism. As mentioned hereinabove, when the component parts are in the positions shown in the latter Figures, the parking brake is released and, accordingly, pedal lever 36 is in its retracted position and cable drum assembly 38 is in its released position. The parking brake of the vehicle is adapted to be set by displacing pedal lever 36 clockwise about the axis of pin 32 from the retracted to a depressed position which will be determined at least in part by the tension on cable 48 when the brake is set. When pedal lever 36 is first displaced clockwise about the axis of pin 32, pawl 62 moves out of engagement with positioning member 74 and is biased by spring 66 into engagement with teeth 70 on cable drum plate 42, whereby pedal lever 36 and cable drum assembly 38 move clockwise together. Such initial clockwise displacement of pedal lever 36 also moves tab 112 on hub 52 out of engagement with arm 108b of lever 108, whereby spring 114 biases the lever counterclockwise to displace tab 120 away from leg 118 of pawl 86 so that nose 90 of the pawl is biased by spring 88 into engagement with teeth 68 of cable drum plate 42. As pedal lever 36 is displaced toward the depressed position thereof nose 82 of pawl 76 rides along teeth 60 of the pedal lever and nose 90 of pawl 86 rides along teeth 68 of the cable drum plate and, during clockwise displacement of the latter, brake cable 48 enters channel 50 between cable drum plates 42 and 44 to tension cable 48 and set the vehicle parking brake.

When pedal lever 36 reaches the depressed position in which it has displaced the cable drum assembly to the cable tensioned position thereof, pawls 76 and 86 respectively hold pedal lever 36 and cable drum assembly 38 in the depressed and cable tensioned positions. In the latter positions, the tension in cable 48 applies a biasing force tending to rotate the cable drum assembly counterclockwise back towards the released position thereof, and spring 122 exerts a bias against pedal lever 36 tending to return the latter to its retracted position. It is important to note at this point that the load imposed on the brake operating assembly through the tension in brake cable 48 is held by pawl 86, whereby pawl 76 is only loaded to the extent provided by the biasing force of spring 122.

To release the vehicle parking brake, rod 94 is pulled to the right in FIG. 1 to pivot release lever 80 counter-clockwise about pin 78, whereby tab 104 on lever 80 engages end 76a of pawl 76 and displaces the pawl counterclockwise about pin 78 to displace nose 82 from teeth 60. This releases pedal lever 36 for displacement counterclockwise about the axis of pin 32 by spring 122 back to the retracted position of the pedal lever in which lever arm 54 engages stop pad 72. When pedal lever 36 reaches the retracted position, positioning member 74 engages pawl 62 to bias the latter counterclockwise about pin 64 to the position shown in FIGS. 6 and 7 for the purpose set forth hereinafter. Also, as the pedal lever approaches the retracted position thereof, tab 112 on hub 52 of the pedal lever engages arm 108b of release lever 108 to pivot the latter clockwise about pin 110, whereby tab 120 on the release lever engages leg 118 on pawl 86 and displaces the latter counterclockwise about pin 92 for nose 90 of the pawl to be displaced from engagement with teeth 68 of the cable drum assembly. This frees cable drum plate 42 for rotation counterclockwise about pin 32 by the tension in brake cable 48 back to the released position of the cable drum assembly. It will be appreciated that return movement of the cable drum assembly to its released position brings teeth 70 on plate 42 back into position adjacent pawl 62 on pedal lever 36. Such positioning of teeth 70 is accommodated by the previous positioning of pawl 62 resulting from engagement of the latter pawl with positioning member 74. When the pedal lever and cable drum assembly are in the retracted and released positions thereof, spring 122 exerts a bias on the cable drum assembly tending to rotate the latter clockwise about pin 32. As mentioned hereinabove, such bias enables self-adjustment of the mechanism to takeup any slack in the cable which may exist when the vehicle parking brake is in the released position.

Figure 8:
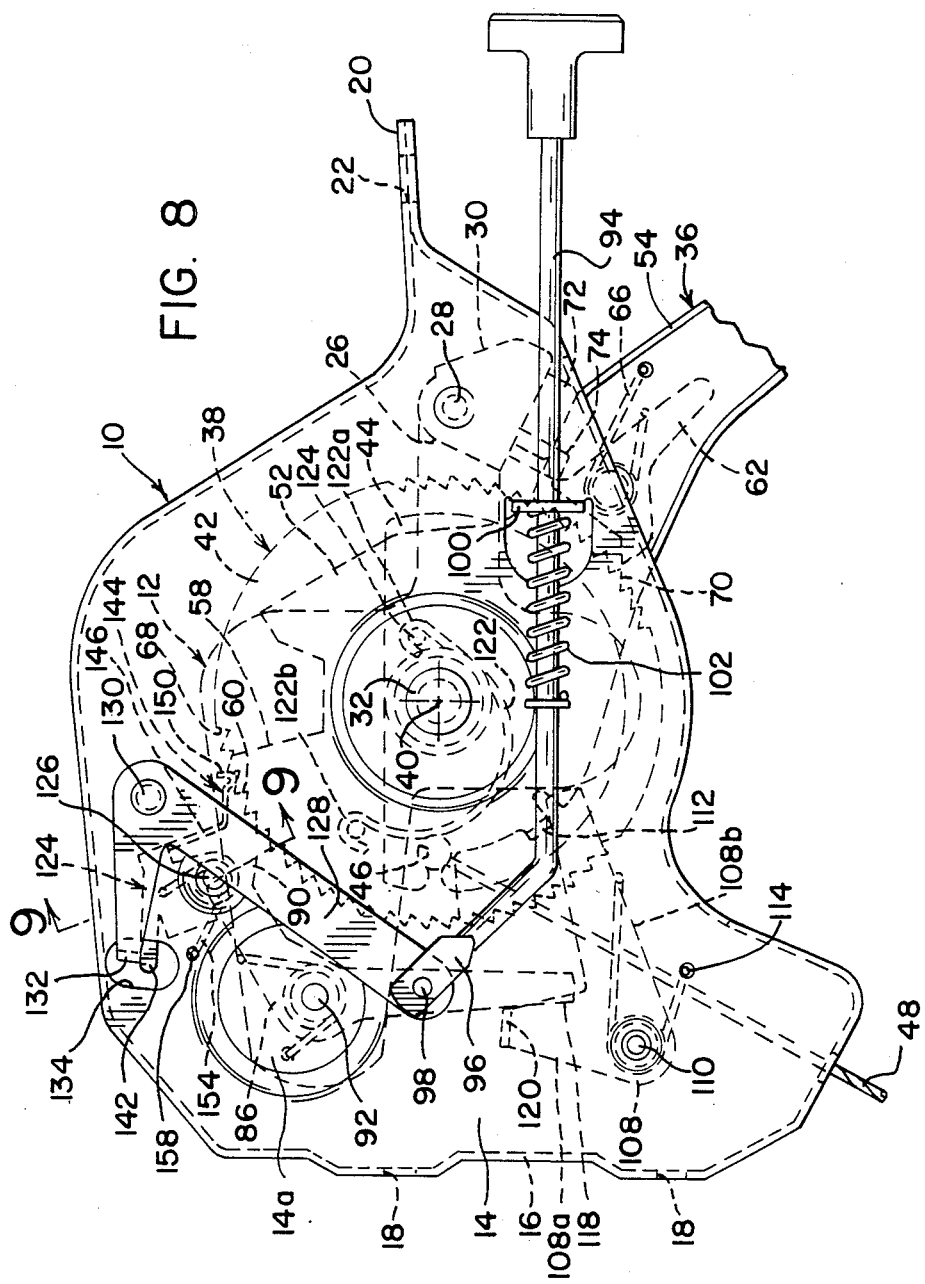
FIG. 8 is a sectional side elevation of a portion of the mechanism, similar to FIG. 1, and showing a modification of the brake pedal lever holding pawl.
Figure 9:
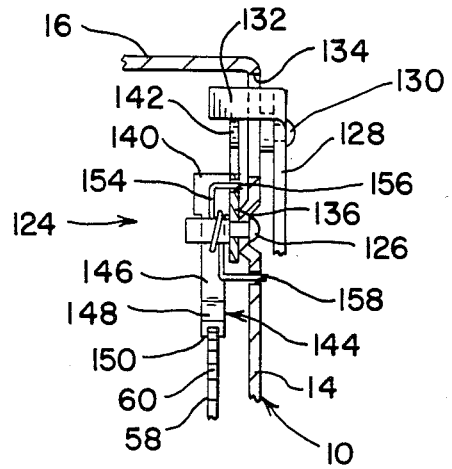
FIG. 9 is a sectional elevation view taken along line 9—9 in FIG. 8.
Figure 10:
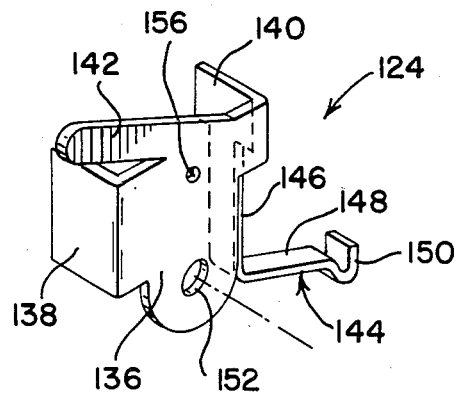
FIG. 10 is a perspective view of the holding pawl.

FIGS. 8, 9 and 10 of the drawing illustrate a modification of the brake pedal lever holding pawl which, as will become apparent hereinafter, finds particular advantage in connection with eliminating the need for maintaining close tolerances between the ratchet and pawl mechanisms of the parking brake assembly. With reference to FIGS. 8-10, wherein like numerals are employed to identify component parts corresponding to those described hereinabove in connection with FIGS. 1-7, pawl 76 in the latter Figures is replaced by a spring steel pawl member 124 which is pivotally mounted on wall 14 of housing 10 by means of a pin 126. A release lever 128 which corresponds functionally to release lever 80 for pawl 76 is pivotally mounted on wall 14 by means of a pin 130. The lower end of release lever 128 is fastened to operating rod 94 by means of pin 98, and the upper end of the release lever includes a tab 132 extending through opening 134 in wall 14 for the same purpose as tab 104 on release lever 80 in FIGS. 1-7.

Pawl 124 includes a mounting plate portion 136 and a pair of flanges 138 and 140 integral with and perpendicular to plate portion 136. The upper end of plate portion 136 includes a release tab 142 which underlies tab 132 on release lever 128 for the purpose set forth hereinafter. A resilient holding finger 144 extends integrally from the lower end of flange 140 and includes a first portion 146 extending downwardly in coplanar relationship with flange 140 and a second portion 148 extending at an angle to portion 146 and terminating in a U-shaped nose 150 adapted to engage against ratchet teeth 60 of the pedal lever as shown in FIG. 8. Plate portion 136 is provided with a mounting opening 152 for pin 126, and interengages with pawl 124 and the housing to bias pawl 124 clockwise in FIG. 8. For this purpose, spring 154 has one end extending through an opening 156 in plate portion 136 and its opposite end extending through an opening 158 in the wall 14 of the housing.

It will be appreciated from the foregoing description of the operation of the mechanism shown in FIGS. 1-7 that when the component parts are in the positions shown in FIG. 8 the parking brake is released, whereby pedal lever 36 is in its retracted position and cable drum assembly 38 is in its released position. The brake setting operation is the same as described hereinabove in connection with FIGS. 1-7 and, with respect to the modification illustrated in FIG. 8, pawl 124 pivots about pin 126 for nose 150 of spring finger 144 to ride along teeth 60 of the pedal lever during clockwise displacement of the latter. When pedal lever 36 reaches the depressed position in which it has displaced the cable drum assembly to the cable tensioned position thereof, nose 150 of pawl 124 engages against a tooth 60 to hold the pedal lever in the depressed position. The brake releasing operation is likewise the same as described hereinabove in connection with FIGS. 1-7 and, with respect to the modification shown in FIG. 8, displacement of operating rod 94 to the right in FIG. 8 initiates the releasing operation. More particularly in this respect, such displacement, of rod 94 pivots release lever 128 counterclockwise about pin 130 for tab 132 to engage release tab 142 of pawl 124, whereby the latter pivots counterclockwise about pin 126 to displace nose 150 of spring finger 144 from engagement with teeth 60, thus to release the pedal lever for displacement counterclockwise about the axis of pin 32 by spring 122.

As mentioned hereinabove in connection with FIGS. 1-7, the only load imposed on the pedal lever when the parking brake is set is that of return spring 122. The load of the tensioned cable is applied only to the cable drum holding pawl 86. Advantageously, the resilience of spring finger 144 of pawl 124 enables eliminating the need to maintain the close tolerances which are required with respect to the positioning of the sets of ratchet teeth and the corresponding pawl members to prevent the load of the tensioned cable from being applied to the pedal lever when the latter is in its depressed position. More particularly in this respect, when the brake pedal lever reaches its depressed position during a brake setting operation as described hereinabove in connection with FIGS. 1-6, the nose of cable drum holding pawl 86 must engage a tooth 68 of the cable drum either before or at exactly the same time as the nose of pedal lever holding pawl 76 engages a tooth 60 of the pedal lever. Otherwise, the load on the cable drum through the tensioning of cable 48 would be applied to holding pawl 76 for the brake pedal lever in that the nose of drive pawl 62 remains in engagement with teeth 70 of the cable drum when the pedal lever is in its depressed position. Therefore, the tension on cable 48 tending to rotate the cable drum counterclockwise, in FIG. 6 for example, would impose a counterclockwise force on the brake pedal lever through drive pawl 62 and thus impose the cable load on brake pedal holding pawl 76. With the foregoing in mind, it will be appreciated from FIG. 8 that the resilience of spring finger 144 as provided primarily by downwardly extending portion 146 thereof will allow the brake pedal lever under the latter condition to move counterclockwise in response to the load on the cable drum. This movement assures engagement between the nose of cable drum holding pawl 86 and a tooth 68 on the cable drum for the total load on the cable drum to be imposed on pawl 86, whereby the only load imposed on pawl 124 is that of the pedal lever return spring 122. Moreover, as mentioned above, such is advantageously achieved without the need for the close tolerances otherwise required.

While particular emphasis has been placed on the preferred embodiment herein illustrated and described, it will be appreciated that many embodiments of the invention can be made and that many changes can be made in the preferred embodiment without departing from the principles of the present invention. In this respect, for example, a pedal lever return spring connected between the pedal lever and support housing could be employed to achieve return of the pedal lever to its retracted position and, if the self-adjusting feature is desired, a separate spring between the cable drum assembly and housing could be provided for the latter purpose. Further, one-way drive arrangements other than a lever mounted pawl can be employed to achieve rotation of the cable drum assembly to the cable tensioning position thereof in response to displacement of the pedal lever from the retracted to the depressed position, and other holding and release arrangements as well as modifications of those illustrated and described herein can be provided for performing the required functions thereof. These and other modifications will be suggested and obvious to those skilled in the art upon reading the foregoing description, whereby it is to be distinctly understood that the descriptive matter herein is to be interpreted merely as illustrative of the invention and not as a limitation.

Having thus described the invention, it is claimed:

1. A vehicle parking brake operating mechanism comprising support means, brake cable tensioning means engaged with a brake cable and supported on said support means for displacement between cable tensioning and released positions, brake pedal lever means supported on said support means for displacement between depressed and retracted positions, means biasing said pedal lever means toward said retracted position, means interengaging said pedal lever means and cable tensioning means and displacing said cable tensioning means to said cable tensioning position in response to displacement of said pedal lever means from said retracted to said depressed position, means releaseably holding said pedal lever means in said depressed position and said cable tensioning means in said cable tensioning position, and brake release means sequentially releasing said pedal lever means and cable tensioning means for displacement of said pedal lever means from said depressed to said retracted position and displacement of said cable tensioning means from said cable tensioning to said released position.

2. The parking brake operating mechanism according to claim 1, wherein said means releaseably holding said pedal lever means and cable tension means includes first holding means for said pedal lever means and second holding means for said cable tensioning means, and said brake release means includes means to release said first holding means and means actuated by said pedal lever means to release said second holding means during displacement of said pedal lever means from said depressed to said retracted position.

3. The parking brake operating mechanism according to claim 1, wherein said cable tensioning means and pedal lever means are supported on said support means for pivotal movement relative to one another about a common axis.

4. The parking brake operating mechanism according to claim 3, wherein said means interengaging said cable tensioning means and pedal lever means includes one-way clutch means.

5. The parking brake operating mechanism according to claim 4, wherein said one-way clutch means includes pawl means on said pedal lever means and means providing ratchet teeth on said cable tensioning means.

6. The parking brake operating mechanism according to claim 3, wherein said means releaseably holding said pedal lever means and cable tensioning means includes first holding means for said pedal lever means and second holding means for said cable tensioning means, and said brake release means includes means to release said first holding means and means actuated by said pedal lever means to release said second holding means during displacement of said pedal lever means from said depressed to said retracted position.

7. The parking brake operating mechanism according to claim 6, wherein said first holding means includes first pawl means on said support means and pivotal between holding and release positions relative to said pedal lever means, and said second holding means includes second pawl means on said support means and pivotal between holding and release positions relative to said cable tensioning means.

8. The parking brake operating mechanism according to claim 7, wherein said first pawl means includes resilient finger means, said finger means in said holding position being displaceable against the resilience thereof in the direction of displacement of said pedal lever means from said depressed to said retracted position.

9. The parking brake operating mechanism according to claim 7, wherein said means to release said first holding means includes manually displaceable means to pivot said first pawl means from said holding to said release position thereof, and said means actuated by said pedal lever means includes means engaged by said pedal lever means to pivot said second pawl means from said holding to said release position thereof.

10. The parking brake operating mechanism according to claim 9, wherein said means interengaging said cable tensioning means and pedal lever means includes one-way clutch means.

11. The parking brake operating mechanism according to claim 10, wherein said first pawl means includes resilient finger means, said finger means in said holding position being displaceable against the resilience thereof in the direction of displacement of said pedal lever means from said depressed to said retracted position.

12. The parking brake operating mechanism according to claim 11, wherein said one-way clutch means includes pawl means on said pedal lever means and means providing ratchet teeth on said cable tensioning means.

13. A vehicle parking brake operating mechanism comprising support means, brake cable drum means engaged with a brake cable and supported on said support means for pivotal displacement in opposite directions about an axis and between cable tensioning and released positions, a brake pedal lever supported on said support means for pivotal displacement in opposite directions about said axis between depressed and retracted positions, one-way clutch means interconnecting said lever and drum means for displacement of said lever from said retracted toward said depressed position to displace said drum means from said released to said cable tensioning position, drum holding means releaseably holding said drum means in said cable tensioning position, biasing means biasing said lever from said depressed toward said retracted position, pedal lever holding means releaseably holding said pedal lever in said depressed position against the bias of said biasing means, first release means releasing said pedal lever holding means for said pedal lever to be displaced from said depressed to said retracted position by said biasing means, and second release means actuated by said pedal lever during said displacement thereof to said retracted position and releasing said drum holding means for said drum means to be displaced from said cable tensioning to said released position thereof by the tension in said cable.

14. The parking brake operating mechanism according to claim 13, wherein said one-way clutch means includes ratchet teeth on said drum means and pawl means on said pedal lever.

15. The parking brake operating mechanism according to claim 13, wherein said drum holding means and said pedal lever holding means include ratchet teeth on the corresponding one of said drum means and pedal lever, a drum holding pawl on said support means releaseably engaging the ratchet teeth on said drum means, and a pedal lever holding pawl on said support means engaging the ratchet teeth on said pedal lever.

16. The parking brake operating mechanism according to claim 15, wherein said pedal lever holding pawl includes a resilient finger engaging the ratchet teeth on said pedal lever and being displaceable against the resilience thereof in the direction of displacement of said pedal lever from said depressed to said retracted position.

17. The parking brake operating mechanism according to claim 15, wherein said first release means includes a manually actuated first release lever pivotally mounted on said support means to displace said pedal lever holding pawl from engagement with said ratchet teeth on said pedal lever.

18. The parking brake operating mechanism according to claim 15, wherein said second release means includes second release lever means pivotally mounted on said support means for displacement between first and second positions and means on said pedal lever to engage and displace said second release lever means from said first to said second position during displacement of said pedal lever from said depressed to said retracted position, said second release lever means in said second position displacing said drum holding pawl from engagement with said ratchet teeth on said drum means.

19. The parking brake operating mechanism according to claim 18, wherein said first release means includes a manually actuated first release lever pivotally mounted on said support means to displace said pedal lever holding pawl from engagement with said ratchet teeth on said pedal lever.

20. The parking brake operating mechanism according to claim 19, wherein said one-way clutch means includes ratchet teeth on said drum means and pawl means on said pedal lever.

21. The parking brake operating mechanism according to claim 18, wherein said pedal lever holding pawl includes a resilient finger engaging the ratchet teeth on said pedal lever and being displaceable against the resilience thereof in the direction of displacement of said pedal lever from said depressed to said retracted position.

22. The parking brake operating mechanism according to claim 21, wherein said first release means includes a manually actuated first release lever pivotally mounted on said support means to displace said resilient finger from engagement with said ratchet teeth on said pedal lever.

23. The parking brake operating mechanism according to claim 22, wherein said one-way clutch means includes ratchet teeth on said drum means and pawl means on said pedal lever.

* * * * *